United States Patent [19]

O'Connor

[11] Patent Number: 6,159,273
[45] Date of Patent: Dec. 12, 2000

[54] EMISSION CONTROL SYSTEM AND METHOD FOR CONTROLLING THE AMOUNT OF AIRBORNE PARTICULATE MATTER DISCHARGING FROM A FIBER PROCESSING PLANT

[76] Inventor: Dennis J. O'Connor, 8674 Rosalee Rd., Atoka, Tenn. 38004

[21] Appl. No.: 09/167,294

[22] Filed: Oct. 6, 1998

[51] Int. Cl.[7] .......................... B01D 29/25; B01D 45/02; B01D 50/00
[52] U.S. Cl. .................... 95/273; 55/319; 55/378
[58] Field of Search .............. 55/315, 318, 319, 55/378, 374, 361; 95/273; 19/107; 406/171

[56] References Cited

U.S. PATENT DOCUMENTS

| | | | |
|---|---|---|---|
| 1,448,322 | 3/1923 | Wirls | 55/319 |
| 1,593,965 | 7/1926 | Cobb . | |
| 3,150,514 | 9/1964 | Reiterer | 19/107 |
| 3,612,616 | 10/1971 | Stewart | 19/107 |
| 3,928,892 | 12/1975 | Ferri | 19/200 |
| 3,987,517 | 10/1976 | Bonalumi | 19/107 |
| 4,180,390 | 12/1979 | Furstenberg | 55/272 |
| 4,183,150 | 1/1980 | Nash | 55/319 |
| 4,294,597 | 10/1981 | Archer et al. | 55/319 |
| 4,799,295 | 1/1989 | Benfield | 19/159 R |
| 5,361,450 | 11/1994 | Shofner et al. | 19/66 R |

FOREIGN PATENT DOCUMENTS

| | | | |
|---|---|---|---|
| 574375 | 1/1946 | United Kingdom | 55/319 |

OTHER PUBLICATIONS

Memphis & Shelby County Health Department, Operating Permit No. 0646–02P(R) Issued Apr. 30, 1996, 3 pages of text and attached 1 page schematic.

"The Covington Leader" Newspaper, Covington, Tennessee, Article Entitled "Public Notice", Feb. 12, 1997, 1 page.

Dennis O'Connor, president of Flying O Enterprises, Inc., Permit Application submitted to the State of Tennessee, Department of Environment and Conservation, Division of Air Pollution Control, Jan. 2, 1997, 9 pages.

Flying O Enterprises, Inc., simplified flow diagram, submitted to Tennessee Department of Environment & Conservation on Apr. 22, 1997, 1 page.

John W. Walton, Technical Secretary, Tennessee Air Pollution Control Board, letter to Mr. Dennis J. O'Connor of Flying O Enterprises, Inc., Oct. 6, 1997, 1 page letter with 2 pages of attachments including Request for Protection Order Confidential Information (1 page) and approval form (1 page).

*Primary Examiner*—David A. Simmons
*Assistant Examiner*—Robert A. Hopkins
*Attorney, Agent, or Firm*—Garrison, Morris, Haight, & Morrow, PLLC

[57] ABSTRACT

An emissions control system and method are provided for controlling the particulate matter within the fiber-containing airflow discharging from a fiber processing plant, such as a cotton gin. The system includes an upstream housing defining a settling chamber therewithin which communicates with at least one conduit used to discharge a fiber-containing airflow from the fiber processing plant. The system further includes a downstream housing defining a filtering chamber therewithin which communicates with the settling chamber. A porous, bag-type filter is disposed within the filtering chamber and includes an opening in communication with the settling chamber. A forward end of the filter, which includes the inlet opening, is disposed in sealing engagement with a wall separating the settling and filtering chambers so that substantially all of the fiber-containing airflow which enters the settling chamber is forced to flow through the filter. The airflow then discharges from the filtering chamber through a discharge port formed in a floor of the downstream housing. The porous, bag-type filter is made of a fabric material having a mesh size and surface area which are selected to control the particulate matter within the fiber-containing airflow to an acceptable level as it discharges from the filtering chamber.

31 Claims, 9 Drawing Sheets

EMISSION CONTROL SYSTEM AND METHOD FOR CONTROLLING THE AMOUNT OF AIRBORNE PARTICULATE MATTER DISCHARGING FROM A FIBER PROCESSING PLANT

BACKGROUND

1. Field of the Invention

The present invention relates generally to fiber processing plants and, more particularly, to an emission control system and method for controlling the amount of airborne particulate matter in the fiber-containing airflow discharging from the fiber processing plant.

2. Related Art

Fiber processing plants typically produce one or more fiber-containing airflows discharging from one or more machines used to process the fiber, which may be natural or synthetic. In some instances, this fiber-containing airflow is discharged to the environment surrounding the plant, while in other instances it is recycled to the interior of the plant. In either case, it is important to control the amount of particulate matter within the fiber-containing airflow, either for environmental considerations exterior of the plant or for health considerations with respect to the workers within the plant. The weight flowrate of the particulate matter within the fiber-containing airflow may be relatively high and accordingly, control of this airborne pollution has been an ongoing concern.

Various devices and methods have been used to control the airborne pollution discharging from fiber processing plants. For instance, cotton gins have typically used a plurality of devices known as cyclones to separate at least a portion of the particulate matter from the fiber-containing airflows discharging from the cotton gin. Cotton gins typically include a network of pipes or conduits which are used to transport the cotton from one processing machine to another within the plant, as a result of the pressure of the airflow within the pipes. The fiber processing devices within a cotton gin typically include at least one ginning stand which is used to remove the cotton seeds, a feed control device, an incline, one or more dryers, a plurality of lint cleaners or separators and one or more cotton balers. Several of these fiber processing devices, such as each of the separators, typically communicate with a pipe containing an exhaust fan. The system of exhaust pipes and fans are used to create the required suction to transport the cotton from one station to another and to perform the required processing within a particular device.

Due to the nature of the processing within the particular fiber processing device, the airflow within the corresponding exhaust pipe may include relatively small fibers of cotton and other particulate matter such as particles of leaves from the cotton plant or other debris. For instance, a lint cleaner or separator typically includes an internal, screen drum, with the interior of this drum communicating with the exhaust pipe. The screen mesh is too small to permit the relatively large cotton staple to pass through the screen, but is small enough to permit relatively small pieces of cotton lint, pieces of cotton plant leaves or other debris to pass through the screen and into the exhaust pipe. Each of these exhaust pipes, which are used to transport the fiber-containing airflow, is coupled to a cyclone where the airflow is directed tangentially into an upper portion of the cyclone. As a result of the tangential entry into the cyclone, the fiber-containing airflow spirals downward along the inner wall of the cyclone. At the bottom of the lower, conical portion of the cyclone, the air reverses direction and spirals up the center of the cyclone, exhausting to atmosphere through a centrally disposed vent tube and an upper, outlet opening in the cyclone. At the point of air direction reversal, a large portion of the particulate matter, or trash, being conveyed in the airflow precipitates out the bottom of the cyclone and is deposited onto the ground or alternatively onto a collection device such as the bed of a truck. The remainder of the particulate matter discharges through the top vent opening of the cyclone directly into the atmosphere without being collected. This creates a "cloud" of particulate matter surrounding the cyclone which is a source of airborne pollution. The amount of particulate matter deposited on the ground, as compared to the amount which remains airborne, depends on the efficiency of the cyclone. The allowable emissions from a cotton gin may vary with process weight rate, as stipulated by environmental control regulations. For instance, a cotton gin having a process weight rate of 14,000 lbs/hr may have a permissible rate of airborne emissions of about 15 lbs/hr, which results in a substantial amount of airborne pollution. This problem may be exacerbated by the use of cyclones as an emission control device, since a portion of the airflow discharges through the lower outlet port of the cyclone at a relatively high velocity as it impacts the particulate matter lying on the ground or the collection device, which adds to the cloud of airborne pollution surrounding the cyclone.

Mote plants, which are used to process lower grades of cotton containing a significant amount of debris, provide another example of cotton processing plants which utilize the previously described cyclones. Although the governing environmental regulations may impose a much stricter limit on the airborne particulate matter discharging from mote plants, for instance 6.0 lbs/hr in some areas, these plants may still generate a significant amount of airborne pollution.

Another disadvantage associated with the use of cyclones, when trucks or other motorized vehicles are used to collect or transport the pile of trash precipitated from the fiber-containing airflow, is the adverse affect on the operation and maintenance of the trucks or other vehicles. For instance, the small fibers of cotton and other particulate matter tend to collect on various parts of the vehicle, including the engine, battery and radiator, which has been known to cause vehicle fires or overheating resulting in serious damage to the vehicle.

Historically, cotton gins and other cotton processing plants have been located in rural areas having a relatively low density of both commercial and residential homes. However, an increasing number of these areas are being developed with respect to both commercial and residential structures, which increases the need for improved methods of controlling the airborne pollution emanating from cotton gins and other cotton processing plants. Over the years, as the population has expanded toward the rural areas, some cotton gins have been forced out of business due to environmental considerations.

Other known air cleaning or emission control systems associated with fiber processing plants may include rotating machinery and/or other pieces of relatively complex machinery. For instance, known air cleaning systems associated with textile mills may include a motorized sweep mechanism to remove the fibers and other particulate matter collected on a screen-covered drum after a fiber-containing airflow has passed through the drum, and an auger or screw conveyor to transport the fibers and other particulate matter to a collection area. While these systems may be advantageously used with regard to emission control, the included equipment is relatively complex and may have relatively high purchase and maintenance costs.

In view of the foregoing deficiencies associated with known devices and methods for controlling the airborne pollution discharging from fiber processing plants, there remains a need for a simple, economic and efficient emission control system and method for controlling the particulate matter discharging from a fiber processing plant.

SUMMARY

In view of the foregoing needs, the present invention is directed to a simple, cost effective and efficient emission control system and method for controlling the amount of airborne particulate matter discharging from a fiber processing plant having at least one fiber processing device and at least one conduit transporting a fiber-containing airflow from the device. Although the emission control system and method of the present invention may be efficiently and advantageously utilized to control the amount of airborne particulate matter discharging from any fiber processing plant, processing either natural or synthetic fibers, the emission control system and method of the present invention are particularly useful in controlling the weight flowrate of airborne particulate matter discharging from cotton gins or other cotton processing plants.

The emission control system of the present invention is relatively simple and inexpensive to install, and may be used in conjunction with a new fiber processing plant or added onto an existing facility in a relatively easy manner. Furthermore, the emission control system of the present invention does not include any rotating machinery or other high maintenance devices, and is therefore relatively simple and inexpensive to operate and maintain. The emission control system includes an upstream housing defining a settling chamber and a downstream housing defining a filtering chamber. The fiber-containing airflows discharging from the fiber processing plant are directed to the settling chamber which has a relatively large volume so as to diffuse the airflow entering the settling chamber. Accordingly, the fiber-containing airflow has a relatively low velocity within the settling chamber so that a portion of the fibers and other particulate matter precipitate out of the airflow and settle onto the floor. The airflow then enters the filtering chamber where the airflow is filtered by a porous, bag-type filter located within the filtering chamber. The filter is sized, with respect to mesh size and surface area, so that substantially all of the particulate matter may be filtered out of the airflow without clogging the filter and back-pressuring the various machines or devices in the fiber processing plant having an exhaust communicating with the settling chamber.

As the level of the particulate matter on the floor of the settling chamber increases, the airflow within the settling chamber gently pushes the upper layers of the particulate matter into the filtering chamber where they are entrained within the bag-type filter. If the fiber-containing airflow had a relatively high velocity within the settling chamber, the particulate matter would tend to be forced toward the walls and ceiling of the settling chamber, thereby making it difficult to force the particulate matter into the bag-type filter. After passing through the filter, the airflow then discharges from the filtering chamber with a relatively low weight flowrate of particulate matter.

According to a first aspect of the present invention, an emission control system is provided for controlling the amount of airborne particulate matter discharging from a fiber processing plant having at least one fiber processing device and at least one conduit communicating with the fiber processing device. The conduit is effective for transporting a fiber-containing airflow discharging from the device during operation of the device. The fiber-containing airflow may include fibers, such as cotton fibers, and other particulate matter such as pieces of cotton plant leaves or other debris. According to a preferred embodiment the emission control system includes an upstream housing defining a settling chamber which communicates with the conduit of the fiber processing plant and receives the fiber-containing airflow discharging from the conduit. The emission control system further includes a downstream housing defining a filtering chamber which communicates with the settling chamber and a porous bag-type filter disposed within the filtering chamber. The filter has an inlet opening in communication with the settling chamber, whereby the fiber-containing airflow discharging from the settling chamber flows through the inlet opening and into an interior portion of the filter. The fiber-containing airflow entering the interior portion of the filter flows through the filter, thereby entraining a substantial portion of particulate matter in the fiber-containing airflow, and then discharges from the filtering chamber through a discharge port formed in the downstream housing.

The porous bag-type filter is preferably made of a fabric material and preferably has a mesh size ranging from about 60 mesh to about 100 mesh. The filter has a surface area which may vary with application, dependent upon the volumetric flow rate of the fiber-containing airflow being filtered. The numeric ratio of the airflow, in actual cubic feet per minute ($ft^3$/min) to the surface area of the bag-type filter, in square feet ($ft^2$), preferably is no greater than 65 and ranges from about 36 to about 65 in one preferred embodiment. The surface area and mesh size of the bag-type filter combine to control the amount of particulate matter within the fiber-containing airflow discharging through the outlet port to a weight flowrate which is preferably less than 6.0 lbs/hr, and is more preferably less than 1.0 lbs/hr.

A ratio of the volumetric flowrate of the fiber-containing airflow, in actual $ft^3$/min, to the volume of the settling chamber, in cubic feet ($ft^3$), preferably is no greater than 3.0 and ranges from about 1.5 to about 3.0 in one preferred embodiment. This relative sizing of the settling chamber as compared to the volumetric flowrate of the fiber-containing airflow provides the desired diffusion of the airflow within the settling chamber.

The discharge port of the downstream housing is preferably formed in a floor of the downstream housing to accommodate discharge of the airflow from the filtering chamber while controlling the humidity within the filtering chamber to a desired relatively low level by preventing rain or other moisture from entering the filtering chamber. The presence of relatively high humidity within the filtering chamber could cause the fibers and other particulate matter within the fiber-containing airflow to clog the filter.

The upstream housing also includes a floor, and both the upstream and downstream housings include a pair of opposing side walls extending upwardly from the floor, as well as forward and rear walls extending upwardly from the floor and attached to each of the side walls. Both of the housings also include a roof attached to the forward and rear walls and the side walls. The rear wall of the upstream housing also preferably comprises the forward wall of the downstream housing. The upstream housing may include an access door formed in either the front wall or one of the side walls to permit a worker to periodically enter the upstream and downstream housings and collect the fibers and other particulate matter contained within the upstream housing and the filter. The upstream housing further includes at least one aperture which is effective for receiving the at least one conduit of the fiber processing plant. The aperture may be formed in the forward wall or one of the side walls. The emission control system further includes a means for supporting the porous, bag-type filter within the filtering chamber and a sealing means for sealing the forward end of the filter with the forward wall of the downstream housing.

According to a second aspect of the present invention, a method is provided for controlling the airborne particulate matter discharging from a fiber processing plant having at least one fiber processing device and at least one conduit transporting a fiber-containing airflow from the device. According to a preferred embodiment, the method comprises the steps of providing upstream and downstream housings defining a settling chamber and a filtering chamber, respectively, and supplying the fiber-containing airflow to the settling chamber. The method further includes the step of diffusing the fiber-containing airflow within the settling chamber causing at least a portion of the fibers within the fiber-containing airflow to precipitate out of the airflow and settle onto a floor of the upstream housing. The method also includes the steps of establishing fluid communication between the settling and filtering chambers, filtering the fiber-containing airflow as it flows through the filtering chamber, and discharging the fiber-containing airflow from the filtering chamber.

The step of diffusing may comprise the step of sizing the settling chamber so that a numeric ratio of the volumetric flowrate of the fiber-containing airflow, in ft$^3$/min, to the volume of the settling chamber, in ft$^3$, is no greater than 3.0. The step of establishing flow communication between the settling and filtering chambers may comprise the step of forming an opening in a wall separating the settling and filtering chambers.

The step of filtering may comprise the steps of disposing a porous, bag-type filter within the filtering chamber and providing the filter with an inlet opening communicating with the settling chamber.

The step of filtering may further comprise the step of using a fabric material, having a mesh size ranging from about 60 mesh to about 100 mesh, to manufacture the porous, bag-type filter. Also, the step of filtering may comprise the step of controlling the weight flowrate of particulate matter in the fiber-containing airflow to a magnitude of less than 6.0 lbs/hr, or more preferably to a magnitude of less than 1.0 lbs/hr, as the airflow discharges from the filtering chamber.

The inlet opening of the filter is preferably formed in a forward end of the filter and the method further includes the step of forcing substantially all of the fiber-containing airflow to flow through the filter. The step of forcing comprises the steps of disposing the forward end of the filter in surrounding relationship with the opening in the wall separating the settling and filtering chambers and sealing the forward end of the filter against this wall.

The method of the present invention may further include the step of forming a discharge port in the floor of the downstream housing, wherein the step of discharging comprises the step of discharging the fiber-containing airflow through the discharge port.

BRIEF DESCRIPTION OF THE DRAWINGS

These and other features, aspects and advantages of the present invention will become better understood with regard to the following description, appended claims and accompanying drawings, wherein:

DETAILED DESCRIPTION

Figure 1:
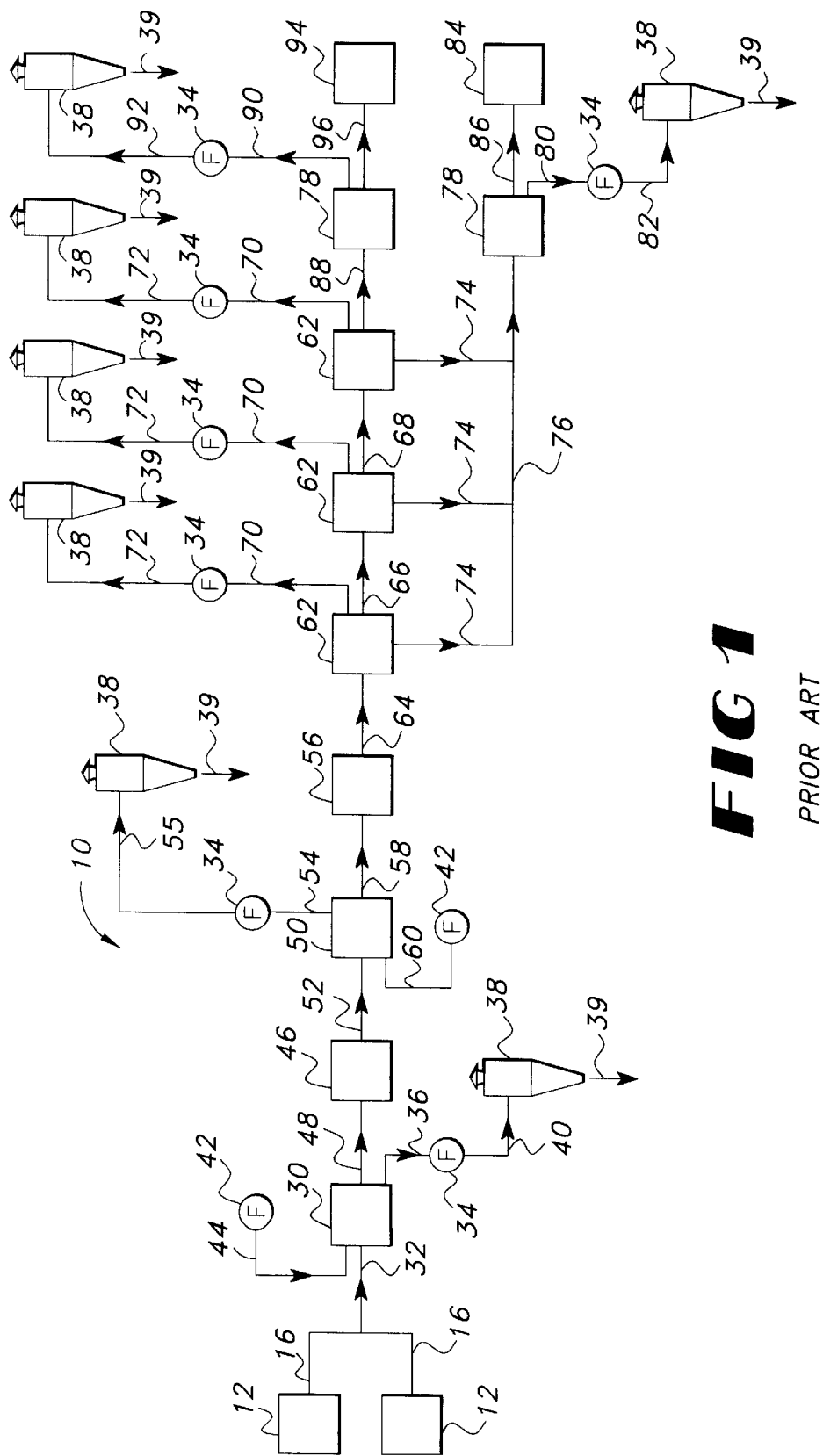
FIG. 1 is a schematic illustration of a typical prior art cotton gin.

Referring now to the drawings, wherein like reference numerals have been used for similar elements throughout, FIG. 1 is a schematic illustration of a prior art fiber processing plant. More particularly FIG. 1 is a schematic illustration of a typical prior art cotton gin 10. Each of the subsequently described fiber processing devices, or machines, of plant 10 are known in the fiber processing art and accordingly, the details of the particular construction of the fiber processing devices included in cotton gin 10 will not be discussed and illustrated in detail. Furthermore, the particular configuration of cotton gin 10 does not form a part of the present invention. Instead, cotton gin 10 is illustrated in FIG. 1 and subsequently discussed to illustrate the particular manner in which fiber-containing airflows may be produced by a fiber processing plant to facilitate an understanding of the manner in which the subsequently described emission control system and method of the present invention may be advantageously utilized to filter and control the airborne particulate matter discharging from fiber processing plants.

In the illustrative example, cotton gin 10 includes two ginning stands 12. Raw, unprocessed cotton is fed into each of the ginning stands 12 where the cotton is cleaned and the seeds of the cotton plant are removed. The cotton then discharges from each of the ginning stands 12 via a conduit 16 which communicates with a conduit 32. The cotton is then supplied to a feed control chamber 30, via the conduit 32. Conduit 32, as well as the other conduits of plant 10 which are subsequently discussed, may comprise a round metal pipe or rectangular metal conduit. The feed control device 30 has a feed control chamber (not shown) which is partially filled with cotton. Feed control device 30 typically includes a tumbling apparatus within the chamber, such as a paddle wheel which is driven by a variable speed motor (not shown) and controls the rate that the cotton is supplied to the downstream processing device. The transport of cotton from the feed table 14 through conduit 32 to the feed control device 30 is assisted by an exhaust fan 34 which creates a slight vacuum within the feed control chamber of device 30 via a conduit 36 which communicates with both the fan 34 and the feed control chamber of device 30. A suitable screen is placed over the entrance to conduit 36 so that relatively large pieces of cotton, or cotton staples, may not enter conduit 36. However, relatively small particles of cotton fiber or debris such as pieces of cotton plant leaves may enter conduit 36 and pass through fan 34. The fiber-containing airflow discharging from fan 34 is supplied to a cyclone 38 via a conduit 40. As shown in FIG. 1, cotton gin 10 includes a plurality of the cyclones 38 which are illustrated in greater detail in FIG. 2. A fiber-containing airflow 39 discharges from the bottom of each cyclone 38, as subsequently discussed in greater detail.

Cotton gin 10 may further include a supply fan 42 which provides a relatively hot, pressurized airflow to the feed control chamber of device 30 which assists in providing the required motive force to transport the cotton from the feed control device 30 to a dryer 46 via a conduit 48. The cotton is heated in dryer 46, which burns a fuel such as propane for a source of heat, for the purpose of drying the relatively small particles of cotton plant leaves which are present in the cotton. The dryer 46 may include a plurality of shelves (not shown) with the cotton passing over each of the shelves, assisted by inlet and outlet fans (not shown). This causes the leaves to become brittle so that they may be broken up into smaller pieces by a fiber processing device 50, referred to in the art as an incline, which is disposed downstream of dryer 46. The cotton is supplied from dryer 46 to incline 50 via a conduit 52. The incline 50 may include a plurality of internal, spiked cylinders (not shown) which may be rotated by a motor (not shown). Under each of the cylinders is a screen (not shown) having a mesh which prevents the cotton staples (which may have a diameter of about one inch or somewhat larger) from passing through the screen, but permits relatively small particles of brittle cotton plant leaves and other debris, which have been separated from the cotton by the spiked cylinders to pass through the screen. An exhaust fan 34, provides a suction pressure on the downstream side of the screen or screens within incline 50 via a conduit 54 so that the relatively small particles of brittle leaves and other debris may discharge the incline 50 through conduit 54 and fan 34. The fiber-containing airflow discharging from fan 34 is supplied to one of the cyclones 38 via a conduit 55. A fiber-containing airflow 39 discharges from the cyclone 38 as shown by flow arrow 39.

The cotton is then transported from incline 50 to a dryer 56 via a conduit 58. The required motive force to transport the cotton through conduit 58 may be provided in part by a supply fan 42 which supplies relatively hot, pressurized air to the incline 50 via a conduit 60 which communicates with fan 42 and incline 50. The dryer 56 provides heat to the cotton contained therein via conventional means, such as a gas burner and a fan, for the purpose of causing any remaining debris such as particles of cotton plant leaves to become brittle to facilitate their removal from the cotton staple. Dryer 56 may include an internal labyrinth comprising an array of vertically arranged shelves, with the cotton being heated as it passes over each of the shelves in succession. The cotton then discharges dryer 56 and is transported to an upstream one of a plurality of lint cleaners or separators 62 via a conduit 64. As shown in FIG. 1, the separators 62 are disposed in series relationship with one another and are interconnected by conduits 66 and 68.

As the cotton enters each of the separators 62, it encounters a hollow screen drum (not shown) having an interior which communicates with an exhaust fan 34 via an exhaust conduit 70. Each exhaust fan 34 creates a suction within the interior of the corresponding separator 62 which assists in transporting the cotton from the immediately upstream device to each of the separators 62. The mesh of the screen drum is sized to prevent the relatively large cotton staple from passing through the screen drum, but is small enough to permit relatively small cotton fibers, lint or other pieces of debris to pass through the screen drum and into one of the exhaust conduits 70. The fiber-containing airflow discharging from each of the separators 62 then passes through the corresponding exhaust fan 34 and is supplied to one of the cyclones 38 via one of a plurality of conduits 72. As subsequently discussed in greater detail, a fiber-containing airflow discharges from each of the cyclones 38 as indicated by flow arrows 39.

Each of the separators 62 includes a conventional means for forming the cotton therein into a relatively thin sheet and for separating the cotton into a first, higher grade or quality of cotton which is substantially free of debris, and a second, lower grade of cotton which may contain debris such as particles of the cotton plant leaves. The lower grade cotton discharges each of the separators 62 via one of a plurality of conduits 74 which communicate with a conduit 76. The lower grade cotton and debris 76 is then transported to a device known in the art as a battery condenser 78 via conduit 76. The transport of the low grade cotton to battery condenser 78 is facilitated by an exhaust fan 34 which communicates with an interior of a hollow screen drum (not shown) disposed within battery condenser 78, via a conduit 80. Battery condenser 78 may further include a means for sweeping lint and other debris off of the low grade cotton, so that this lint and other debris discharges the battery condenser 78 via conduit 80. The fiber-containing airflow flowing through conduit 80 then passes through one of the exhaust fans 34 and is supplied to one of the cyclones 38 via a conduit 82. Again, a fiber-containing airflow discharges from the cyclone 38 as indicated by flow arrow 39. The remainder of the low grade cotton is supplied from the battery condenser 78 to a low grade baler 84 via a chute 86.

The relatively high grade cotton discharging from the downstream one of the separators 62 is supplied to a second battery condenser 78 via a conduit 88. The transport of the high grade cotton through conduit 88 is facilitated by one of the exhaust fans 34 which communicates with the interior portion of the included screen drum (not shown) in condenser 78 via a conduit 90. The fiber-containing airflow which flows through conduit 90 and fan 34 is supplied to another one of the cyclones 38 via a conduit 92. Again, a fiber-containing airflow 39 discharges from the cyclone 38. The relatively high grade cotton is supplied from the corresponding battery condenser 78 to a high grade bailer 94 via a chute 96. The low and high grade cotton may be removed from bailers 84 and 94, respectively, and then bagged and shipped, as finished products of the cotton gin 10.

Figure 2:
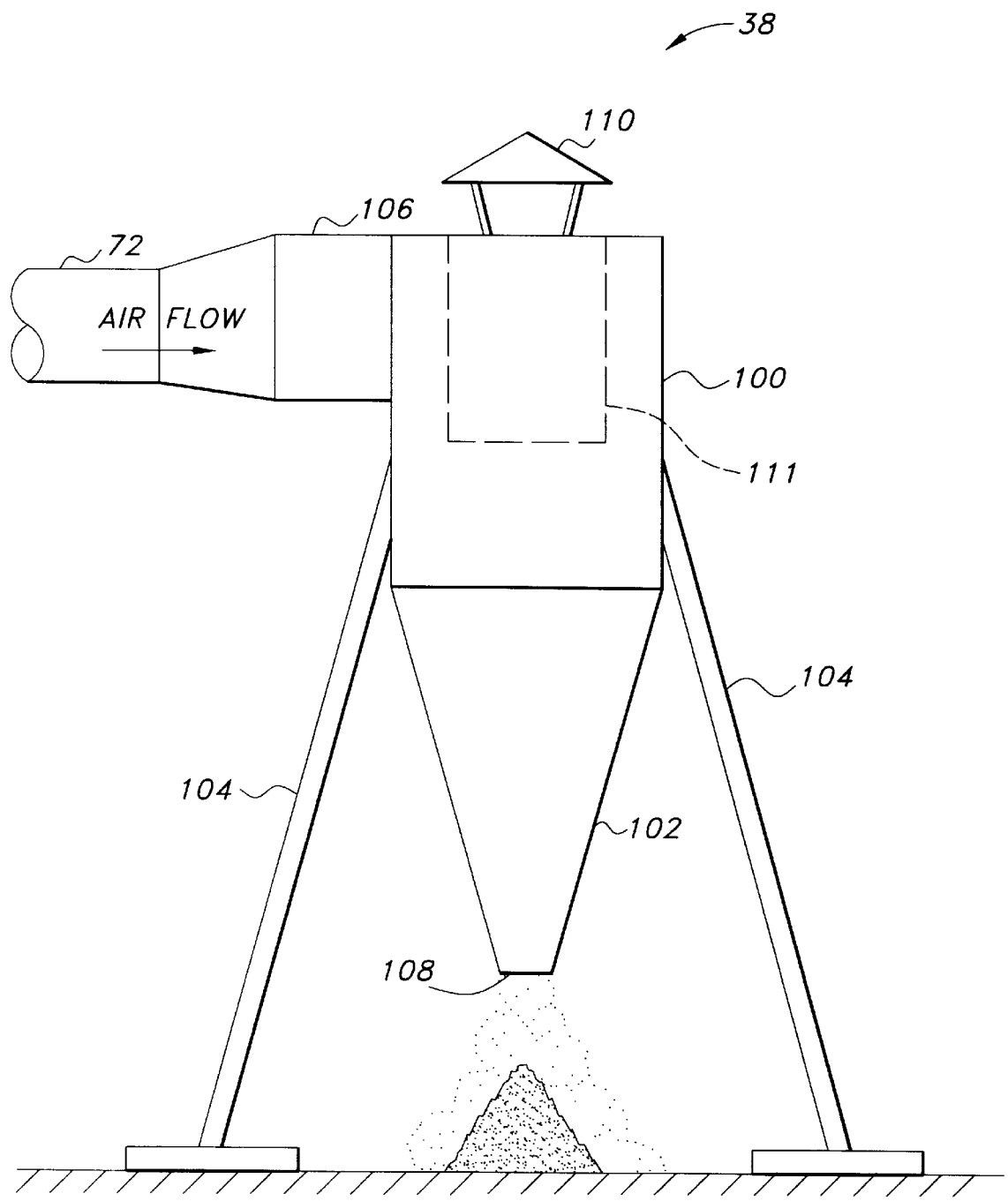
FIG. 2 is an elevation view of one of the prior art cyclones used in the cotton gin shown in FIG. 1.

Referring now to FIG. 2, the particular construction and operation of each of the cyclones 38 is provided in greater detail. Each of the cyclones 38 includes a generally cylindrical upper portion 100 and a generally frustoconically shaped lower portion 102 attached to the upper portion 100. Each cyclone 38 is substantially vertically disposed and may be supported on the ground or other surface by a pair of braces 104 attached to the upper portion 100 of cyclone 38 or by other suitable support means. Each cyclone 38 further includes an inlet port 106 which may comprise a section of pipe, which is attached to the upper portion 100 and communicates with the hollow interior of the upper portion 100. One of the exhaust conduits from cotton gin 10, such as one of the conduits 72 may be attached to the inlet port 106, so that the fiber-containing airflow from one of the fiber processing devices of cotton gin 10, such as one of the separators 62, is supplied into the hollow interior of the upper portion 100 of cyclone 38 through the inlet port 106. The inlet port 106 is oriented such that this airflow enters the upper portion 100 of cyclone 38 in a tangential direction so that the airflow spirals downward around the interior of the upper portion 100 and the lower portion 102. The airflow reverses direction at the bottom of the frustoconically shaped lower portion 102 and discharges through the top of the cyclone 38 as subsequently discussed. At the point of airflow reversal, a substantial portion (which varies with the efficiency of the particular cyclone) of the particulate matter, such as cotton fibers, precipitate out of the airflow and discharge the cyclone 38 through an outlet port or opening (not shown) formed in the lower end 108 of the lower portion 102 of cyclone 38. These solid particles may then fall to the ground or drop onto a means for collecting the particles, such as the bed of a truck.

The upper portion 100 of cyclone 38 is vented to atmosphere via an opening (not shown) formed in the upper end of the upper portion 100. A cover assembly 110 is attached to the upper portion 100 and disposed over the vent opening to prevent moisture from entering cyclone 38. Cyclone 38 also includes an interior discharge pipe 111 which is attached at an upper end to the upper portion 100. The lower end of pipe 111 extends downward partially through the upper portion 100 of cyclone 38 and terminates above the lower frustoconically shaped lower portion 102, although the lower end of pipe 111 may vary somewhat with the design of the particular cyclone being used. After the airflow reverses direction near the bottom of the lower portion 102, the substantial majority of the airflow within cyclone 38 spirals upward through the center of cyclone 38 and discharges cyclone 38 through pipe 111 and the opening in the upper end of the upper portion 100. The airflow discharging through the upper end of cyclone 38 may contain a significant amount of particulate matter, notwithstanding the precipitation of a majority of this matter onto the ground, with the amount varying with the efficiency of the particular cyclone 38. This particulate matter forms a cloud of airborne pollution surrounding cyclone 38. The amount of permissible airborne emissions, or pollution, typically varies with process weight rate of the material such as cotton which is being processed. For instance, with a process weight rate of 14,000 lbs/hr, the allowable rate of airborne emissions is about 15 lbs/hr., at least in certain geographic areas. For higher process weight rates, the allowable airborne emissions increases. It is noted that these allowable emission rates are for an entire plant, and therefore correspond to the total emissions from all of the cyclones 38 used by a particular fiber-processing plant. The remainder of the airflow discharges through the outlet port in the lower end 108 of cyclone 38 with a relatively high velocity as it impacts the pile of particulate matter lying on the ground, or collection device, which adds to the cloud of airborne pollution surrounding the cyclone 38. In addition to the significant airborne pollution which may result from the use of cyclones 38 as emission control devices, the use of cyclones 38 may result in significant damage to the vehicle or vehicles used to collect the particulate matter discharging through the outlet port in the lower end 108 of the lower portion 102 of each cyclone 38, as further discussed in the Background section of this document.

Figure 3:
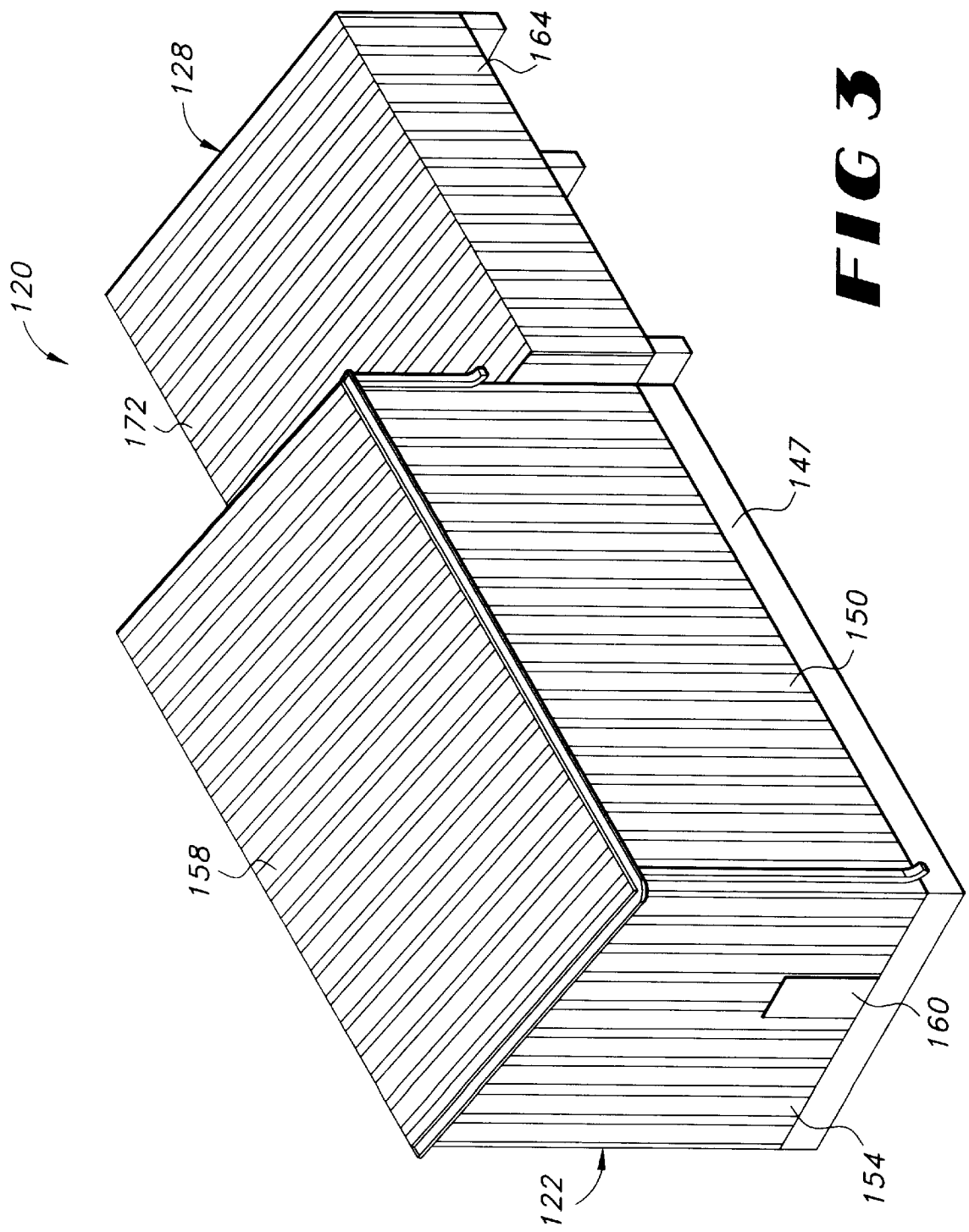
FIG. 3 is a perspective view illustrating the emission control system of the present invention.
Figure 4:
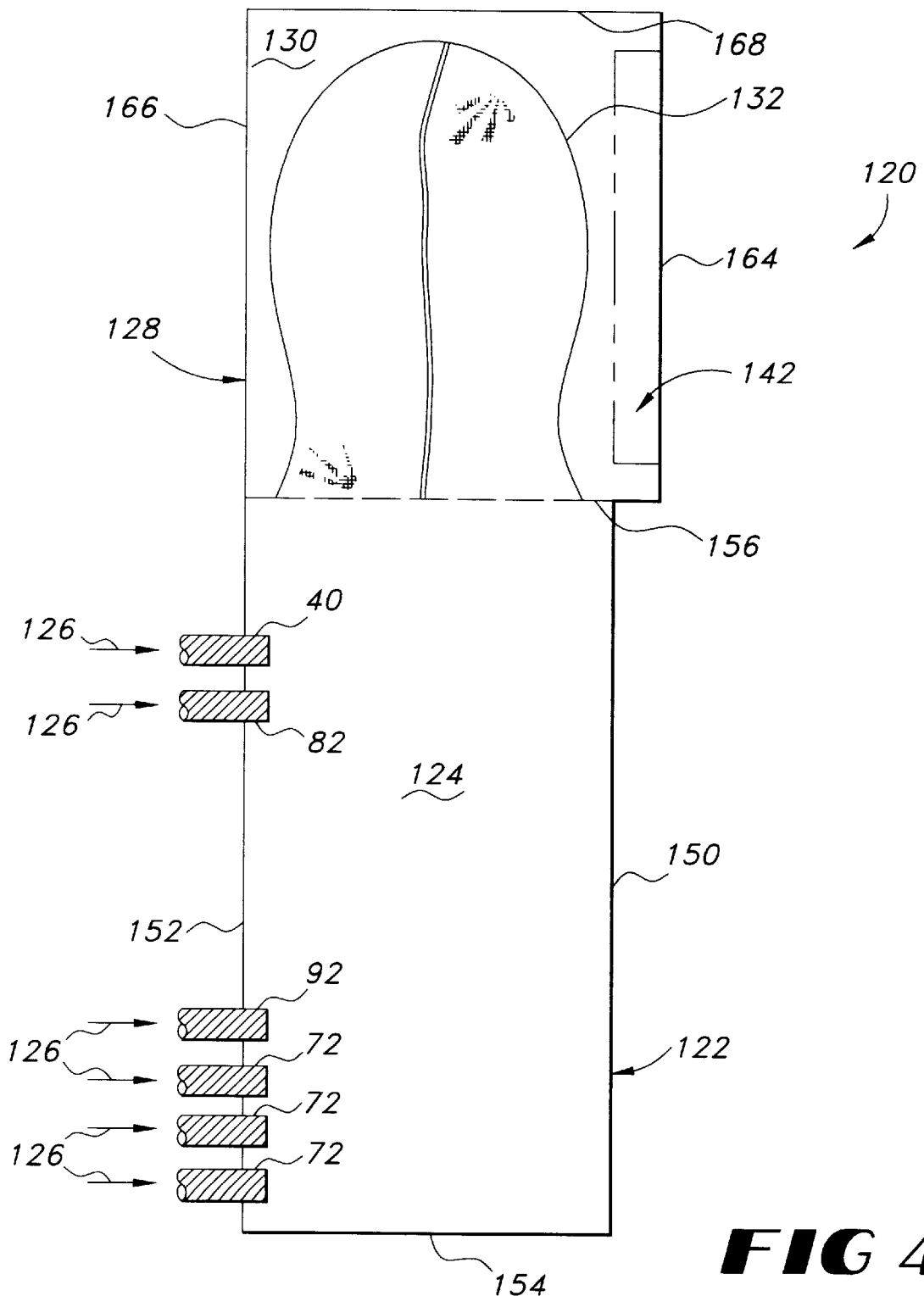
FIG. 4 is a top plan sectional view further illustrating the emission control system shown in FIG. 3.
Figure 5:
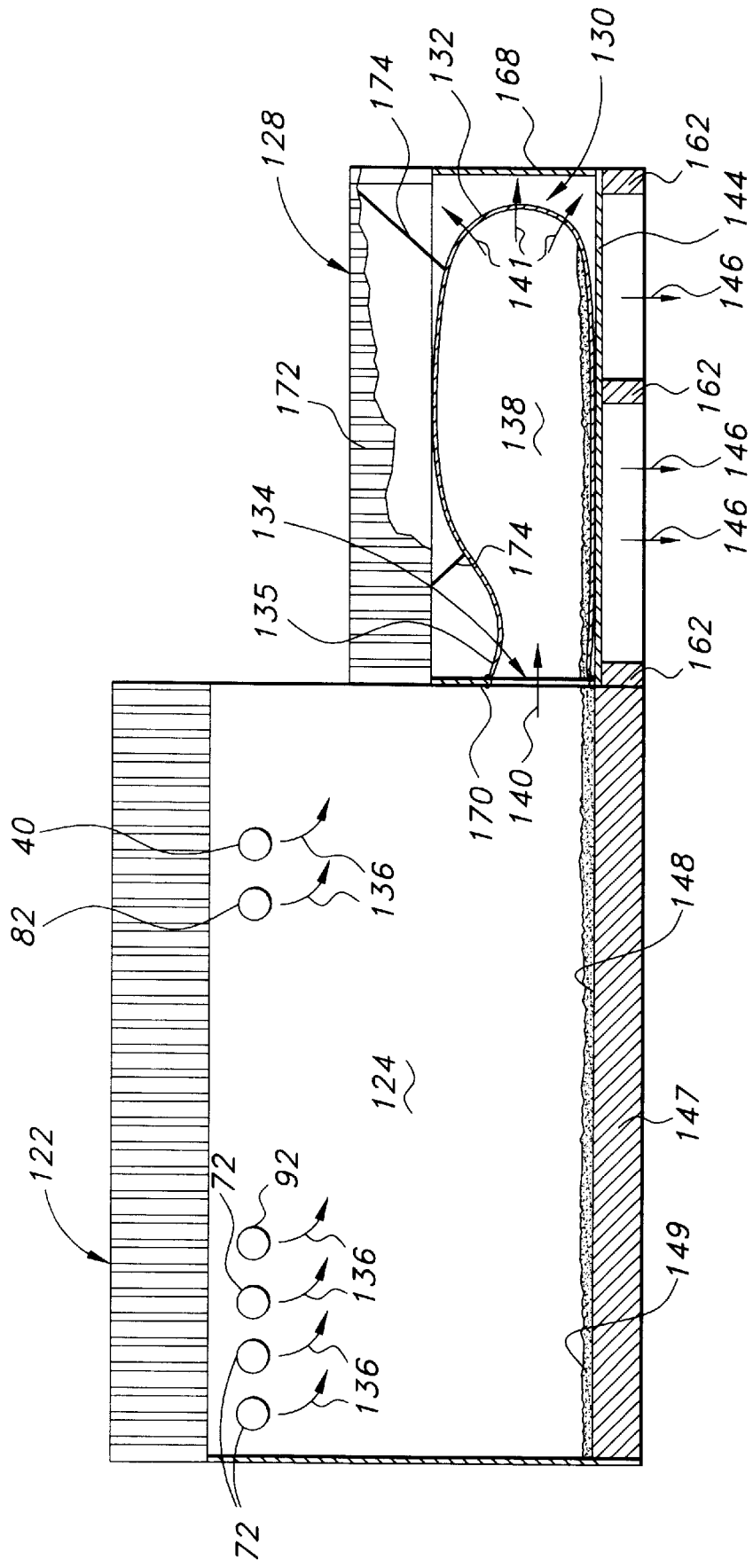
FIG. 5 is a longitudinal sectional view further illustrating the emission control system shown in FIGS. 3 and 4.
Figure 6:
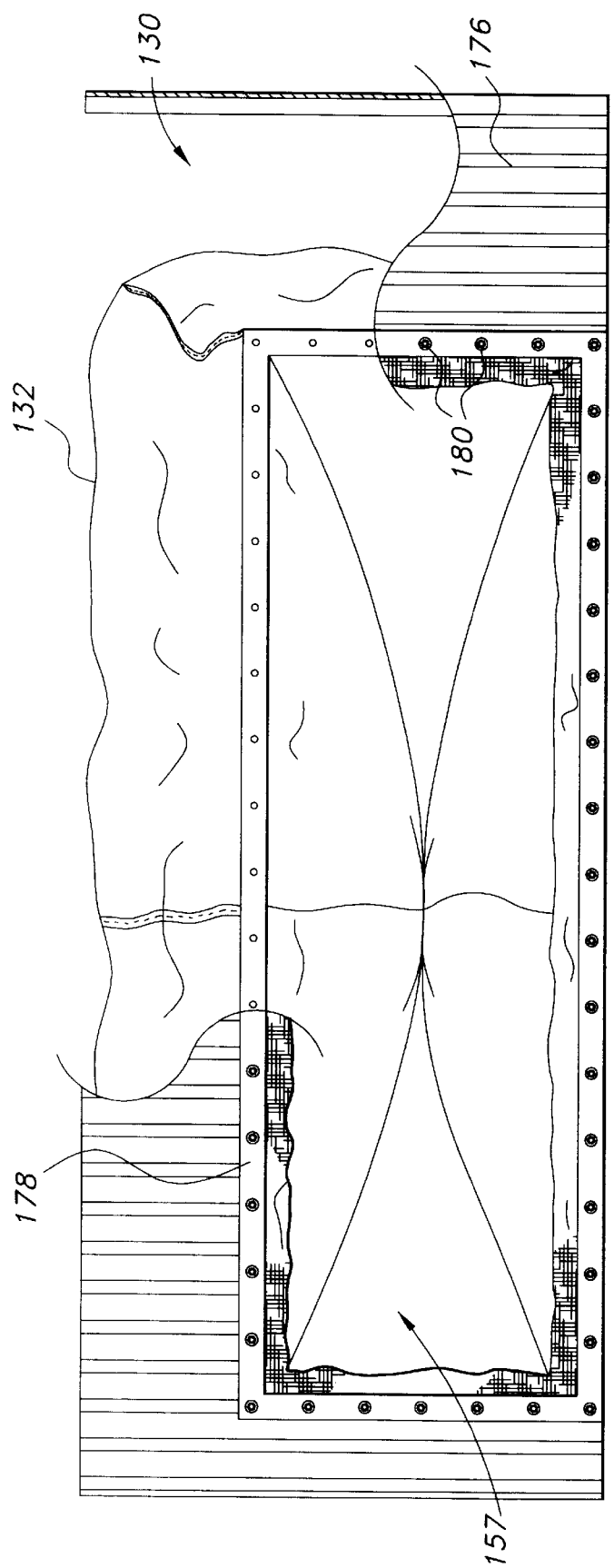
FIG. 6 is a transverse sectional view further illustrating the emission control system shown in FIGS. 3–5.

FIG. 3 is a perspective view illustrating an emission control system 120 according to the present invention. The emission control system 120 is effective for controlling the amount of airborne particulate matter discharging from a fiber processing plant such as cotton gin 10 or a wide variety of other fiber processing plants which may include, but are not limited to, mote plants which process low grade cotton and textile mills which may process a wide variety of natural or synthetic fibers. More particularly, the emission control system 120 is effective for filtering various fiber-containing airflows discharging from fiber processing plants, such as cotton gin 10, thereby significantly reducing the amount of airborne particulate matter discharging from the fiber processing plant into the surrounding atmosphere. FIGS. 4–6 further illustrate the emission control system 120 of the present invention.

The emission control system 120 includes an upstream housing 122 which defines a settling chamber 124 within the upstream housing 122. The settling chamber 124 communicates with at least one conduit used to transport a fiber-containing airflow discharging from a fiber processing plant. It should be understood that the number of conduits will vary with the particular application of system 120. In the illustrated embodiment, the emission control system 120 is advantageously utilized to filter the fiber-containing airflows discharging from the previously discussed cotton gin 10 so as to significantly reduce the airborne particulate matter discharging from cotton gin 10. Since the emission control system 120 of the present invention is used, the cyclones 38 discussed previously are not required. Accordingly, in the illustrative embodiment the settling chamber 124 is in flow communication with the following conduits of cotton gin 10 which transport a fiber-containing airflow exhausting from the previously discussed fiber processing devices of cotton gin 10: each of the conduits 72; and conduits 40, 82 and 92. The fiber-containing airflows flowing through these conduits are depicted by flow arrows 126 in FIG. 4.

The emission control system 120 further includes a downstream housing 128 which defines a filtering chamber 130 in the downstream housing 128. The filtering chamber 130 is in fluid communication with the settling chamber 124 as subsequently discussed in further detail. The emission control system 120 also includes a porous, bag-type filter 132 which is disposed within the filtering chamber 130 and includes an inlet opening 134 formed in a forward end 135 of filter 132 which is in flow communication with the settling chamber 124. The various fiber-containing airflows 126 from the cotton gin 10 flow into the settling chamber 124 as indicated by flow arrows 136, where the airflows are diffused and mixed resulting in a very low velocity airflow within the settling chamber 124. The fiber-containing airflow within settling chamber 124 then flows through the inlet opening 134 of filter 132 and into an interior portion 138 of the bag-type filter 132, as indicated by flow arrow 140. The low velocity of the fiber-containing airflow within the settling chamber 124 is an important feature of the present invention as subsequently discussed in greater detail.

After entering the interior portion 138 of filter 132, the fiber-containing airflow flows through the bag-type filter 132 in many directions, as indicated by flow arrows 141 and into the surrounding portion of the filtering chamber 130. The fiber-containing airflow is filtered as it passes through the bag-type filter 132 so that a substantial portion of the particulate matter is entrained, or captured within the interior portion 138 of filter 132. In the illustrative embodiment, this particulate matter may include cotton fibers, lint, particles of cotton plant leaves and other debris. The fiber-containing airflow then discharges from the filtering chamber 130 through a discharge port 142 (shown in FIG. 4), formed in a floor 144 of the downstream housing 128 and into the surrounding environment as indicated by flow arrows 146 in FIG. 5. The airborne particulate matter within the airflow discharging into the environment surrounding the emission control system 120 is significantly reduced relative to that which enters the settling chamber 124 from the cotton gin 10 and has a very low absolute value. The inventor has determined that the amount of airborne particulate matter discharging from the emissions control system 120 complies with the governing environmental regulations of at least the State of Tennessee as demonstrated by the subsequently described testing discussed in conjunction with FIGS. 7–9, and represents a substantial reduction in airborne pollution relative to that which results from the use of the previously discussed conventional cyclones.

The upstream housing 122 includes a foundation 147 preferably made of concrete or similar material. An upper surface 148 of the foundation 147 comprises a floor of the housing 122. The upstream housing 122 also includes first 150 and second 152 opposing side walls which are attached to and extend upwardly from the floor 148 of housing 128. The upstream housing 122 further includes a forward wall 154 and a rear wall 156 which includes an opening 157 extending therethrough. The opening 157 provides communication between the settling chamber 124 and the filtering chamber 138. Both the forward 154 and rear 156 walls are attached to both of the side walls 150 and 152 and extend upwardly from the floor 148. Housing 122 further includes a roof 158 which is attached to each of the side walls 150 and 152, as well as the forward wall 154 and the rear wall 156. In the illustrative embodiment, side walls 150 and 152, forward wall 154, rear wall 156 and roof 158 are made of a corrugated sheet metal. However, other suitable materials of construction may be used such as substantially flat sheet metal, concrete or bricks provided the material has sufficient strength to withstand the pressure within the settling chamber 124. Additionally, in the illustrative embodiment, the vertical height of side wall 152 is greater than that of side wall 150. Roof 158 and the upper surface of the forward wall 154, as well as the upper surface of the rear wall 156 are sloped to match this difference in the height of the side walls 150 and 152. The sloped roof 158 facilitates drainage of water off of roof 158. However, in other embodiments, the upstream housing 122 may have a substantially flat roof, with the forward, rear and side walls shaped accordingly.

The upstream housing 122 also includes an access door 160 which permits a person to gain access into the settling chamber 124. In the illustrative embodiment, the access door 160 is formed in the forward wall 154 of housing 122. However, door 160 may alternatively be provided in either of the side walls 150 and 152.

As shown in FIGS. 3 and 5, the floor 144 of the downstream housing 128 is supported by foundation members 162 so that the floor is elevated above ground level. The elevation of the floor 144 above the ground is important since this provides a flow path for the airflow discharging from the filtering chamber 130 through the discharge port 142 formed in the floor 144 of the downstream housing 128. Furthermore, it is noted that the discharge port 142 is preferably formed in the floor 144 of housing 128 in order to prevent or at least substantially prevent rain or other moisture from entering the filtering chamber 130. Accordingly, the relative humidity within the filtering chamber 130 is maintained at an acceptably low level, thereby avoiding the clogging of filter 132 which could occur if excessive moisture was present within the filtering chamber 130.

The downstream housing 128 further includes first 164 and second 166 side walls which are attached to and extend upwardly from the floor 144. Housing 128 also includes a rear wall 168 which is attached to and extends upwardly from the floor 144. A lower portion 170 of the rear wall 156 of the upstream housing 122 preferably comprises a forward wall of the downstream housing 128. The downstream housing 128 also includes a roof 172 which is attached to each of the side walls 164 and 166, as well as the rear wall 168. Roof 172 is disposed in abutting relationship with, and may be attached to, the rear wall 156 of the upstream housing 122. In the illustrative embodiment, side walls 164 and 166, rear wall 168 and roof 172 are made of a corrugated sheet metal. However, other suitable materials of construction may be used such as substantially flat sheet metal, concrete or bricks, provided the material has sufficient strength to withstand the pressure within the filtering chamber 132. Additionally, in the illustrative embodiment, the vertical height of side wall 166 is greater than that of side wall 164. Roof 172 and the upper surface of the rear wall 168 are sloped to match this difference in the height of the side walls 164 and 166. The sloped roof 172 facilitates drainage of water off of roof 172. However, in other embodiments, the downstream housing 128 may have a substantially flat roof, with the rear and side walls shaped accordingly.

As shown in FIG. 5, the bag-type filter 132 is generally horizontally disposed within the filtering chamber 130 of the downstream housing, extending longitudinally from the lower portion 170 of wall 156 toward the rear wall 168 of the downstream housing 128. The filter 132 has a somewhat oblong shape when inflated by the fiber-containing airflow 140 flowing into the interior portion 138 of filter 132. As shown in FIGS. 4 and 5, the filter 132 is spaced apart from the side walls 164 and 166, rear wall 168 and roof 172 to prevent any condensation which may form on the walls 164, 166 and 168 and roof 172 from contacting filter 132. As shown in FIG. 5, the bag-type filter 132 may be suspended from an inner surface of the roof 172 by support means which may comprise a plurality of cables 174 or other suitable support means such as wires, ropes or the equivalent to prevent the filter 132 from collapsing when it is not pressurized.

The bag-type filter 132 is preferably made of a fabric material having sufficient mechanical strength so that the filter 132 may withstand an internal pressure of about 15 psig and the weight from the captured cotton fibers and other particulate matter without tearing. In one preferred embodiment, the bag-type filter 132 is made from a 1,000 denier core yarn having a 9×9 weave (9 squares×9 squares per square inch). This weave is equivalent to a mesh size referred to as an 80 mesh as known in the art and is available from Best Tarps, Inc. located in West Memphis, Ark. This fabric or yarn weave may also be referred to as a ten ounce mesh. Another important feature of the bag-type filter 132 is that it is self-sealing to a certain degree. More particularly, if for any reason a tear occurs having a size which is less than the length of the cotton fibers flowing through the interior portion of the filter 132, the fibers may tend to plug the hole, thereby avoiding the escape of an undesirably high amount of airborne particulate matter from downstream of the filter 132. For instance, during operation of the emission control system 120 the inventor has observed that a tear having a diameter of approximately ¾ inch was plugged by the fibers present in the interior portion 138 of filter 132. This self-sealing characteristic, as well as the ability to properly filter the particulate matter flowing into the downstream housing 128 is provided by the combination of the relatively low velocity of the airflow within the interior portion 138 of filter 132 and the mesh size (or weave) for the material of filter 132. In a preferred embodiment, the mesh size ranges from about a 60 mesh to about a 100 mesh, with the size of the openings included in these mesh sizes being known in the art.

Referring now to FIGS. 5 and 6, the forward end 135 of the bag-type filter 132 extends forwardly through the opening 157 of wall 156 and is attached to a forward surface 176 of the substantially vertically extending wall 156. More specifically, forward end 135 of filter 132 includes a web or doubler 178 which has an increased thickness relative to the remainder of filter 132 and is attached to the forward surface 176 by a plurality of conventional fasteners 180. The fasteners 180 may include a plurality of bolts and washers, with one or more of the washers disposed under each bolt head and with each bolt being secured by a nut on an opposite side of wall 156. Alternatively, other suitable fasteners may be used. As shown in FIG. 6, the web 178 is attached on three sides to wall 156 and provides a means for sealing the filter 132 against wall 156. The lower portion of web 178 rests on the floor 148 of the upstream housing 122. One or more weights (not shown) may be positioned on the lower portion of web 178 so that the lower portion of web 178 is disposed in substantially sealing engagement with the floor 148 of the upstream housing 122. The sealing engagement of web 178 with wall 156 and floor 148 forces substantially all of the fiber-containing airflow 140 discharging from the settling chamber 124 to flow through the inlet opening 134 and into the interior portion 138 of filter 132. Alternatively, other sealing means may be provided for sealing the filter 132 to wall 156. For instance, a gasket, made of a suitable material such as rubber, may be used in lieu of or in conjunction with web 178.

Although the surface area of the bag-type filter 132 may vary with application, it is important that the surface area of filter 132 is sufficiently large to provide the required filtering of the fiber-containing airflow 140 entering filter 132 without excessive plugging or clogging of filter 132 during a specified period of operation prior to cleaning filter 132. This is important to avoid an excessive pressure within the interior portion 138 of filter 132 which could back pressure one or more of the fiber processing devices within the cotton gin 10, which could adversely affect the operation of these devices. The numeric ratio of the fiber-containing airflow 140, when expressed in actual ft³/min to the surface area of filter 132, in ft², preferably is no greater than 65 and ranges from about 36 to about 65 in one preferred embodiment.

As mentioned previously, the various fiber-containing airflows which discharge from conduits 40, 72, 82 and 92 into the settling chamber 124 are diffused, and more specifically are significantly diffused, so as to achieve a relatively low velocity of the resultant fiber-containing airflow 140 discharging from the settling chamber 124 into the interior portion 138 of filter 132. The velocity of the airflow 140 preferably ranges from about 0.5 ft/sec to about 1.5 ft/sec to achieve the desired results. This is important since an undesirably high velocity of airflow 140 within the settling chamber 124 would tend to force the particulate matter in the airflow toward the walls and ceiling of the settling chamber 124 which would inhibit forcing the particulate matter into the bag-type filter 132. The relatively low velocity of the airflow within the settling chamber 124 allows a portion of the particulate matter within this airflow to precipitate out of the airflow and settle onto the floor 148 of the upstream housing 122 as shown in FIG. 5. As further shown in FIG. 5, the floor 148 is substantially co-planar with the floor 144 of the downstream housing 128. When a predetermined amount of fibers, indicated generally at 149 in FIG. 5, have accumulated on the floor 148 the airflow 140 gently pushes a portion of these fibers 149 into the interior portion 138 of filter 132. It should also be understood that a certain amount of particulate matter remains in suspension within the airflow 140 discharging from the settling chamber 124 which also enters the interior portion 138 of filter 132. Furthermore, a relatively low velocity of airflow 140 facilitates a uniform disbursement and therefore effective and efficient utilization of a substantial portion of the surface area of the bag-type filter 132.

It may be appreciated that the particular volume of the settling chamber 124 may vary with application. However, in order to achieve the desired diffusion of the airflows entering the settling chamber 124, the numerical ratio of the total fiber-containing airflow entering settling chamber 124, when expressed in actual ft³/min., (in this case the airflow entering the chamber 124 through conduits 40, 72, 82 and 92) to the volume of settling chamber 124 in ft³, preferably is no greater than 3.0 and in one preferred embodiment ranges from about 1.5 to about 3.0.

Figure 7:
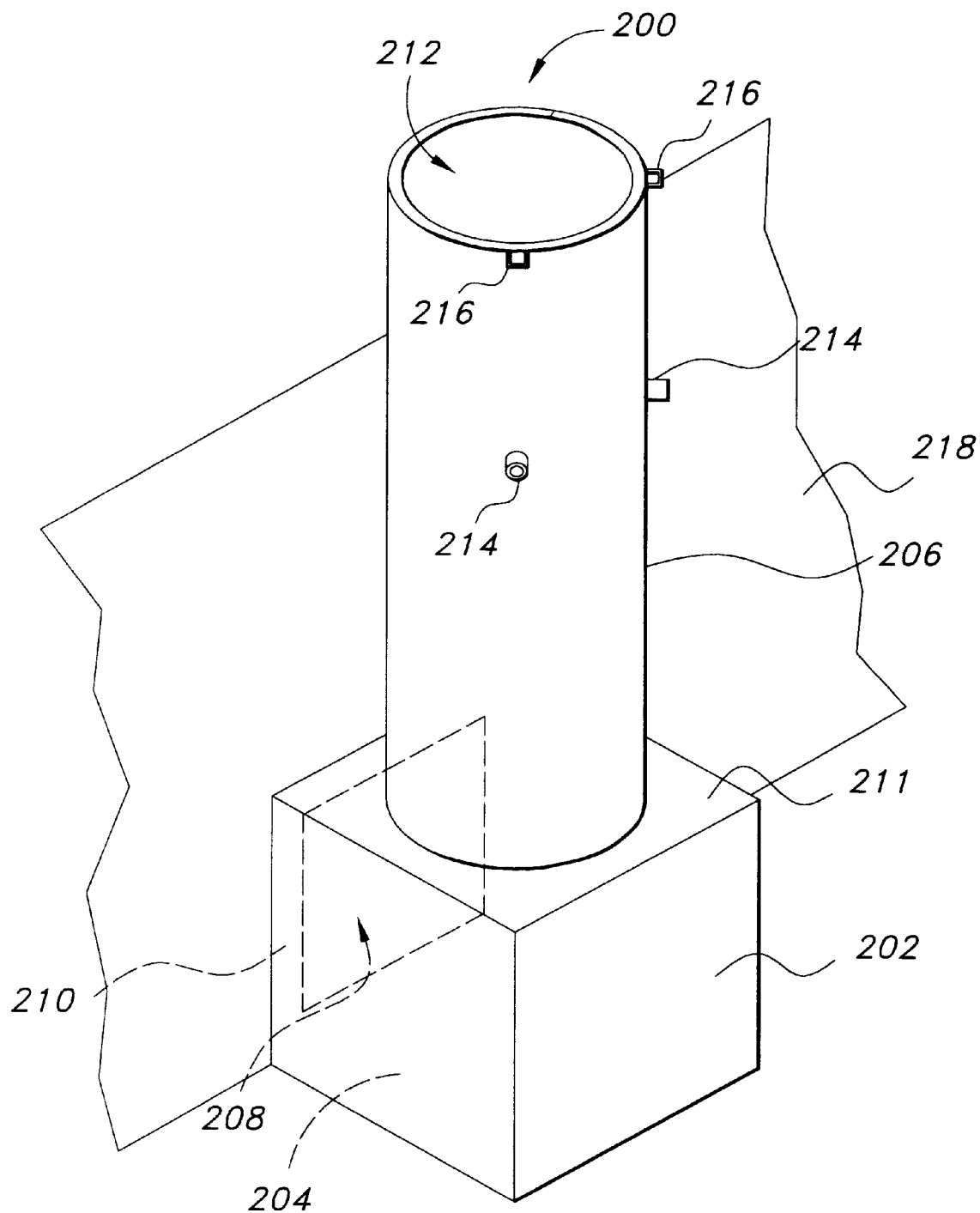
FIG. 7 is a perspective view illustrating one of the exhaust stacks which may be used to test the level of particulate matter in the airflow discharging from the emission control system of the present invention.

FIG. 7 illustrates an exhaust test stack 200 according to the present invention. The exhaust test stack 200 does not form a part of the emission control system of the present invention but instead provides a means for testing the particulate matter within the airflow discharging from the emission control system, either for general information purposes or to demonstrate compliance with specific environmental control regulations or both. As subsequently discussed in greater detail with respect to FIGS. 8 and 9, the inventor has utilized a pair of the exhaust test stacks 200 to determine the particulate matter in the airflow discharging from an emission control system 250 according to a second embodiment of the present invention.

Stack 200 includes a hollow base portion 202 which defines an airflow receiving chamber 204 within base portion 202, and a stack portion 206 which is attached to and extends upwardly from the base portion 202. In the illustrative embodiment, the base portion 202 comprises a parallelepiped having an opening 208 formed in a first side 210 and communicating with chamber 204. A top wall 211 of base portion 202 also includes an opening (not shown) formed therein so that chamber 204 communicates with an interior portion 212 of the stack portion 206. In other embodiments, the base portion 202 may have shapes other than a parallelepiped. In the illustrative embodiment, the stack portion 206 comprises a hollow round pipe which is attached at a lower end to the base portion 206. Stack 200 also includes a pair of pipe nipples 214 which are attached to the stack portion 206 and are suitable for receiving a gas sampling probe such as a pitot probe. The pipe nipples 214 are circumferentially spaced apart by about ninety degrees from one another and are positioned at a vertical height which is about two-thirds of the distance between the lower end of stack portion 206 and the upper end of stack portion 206, as shown in FIG. 7. This positioning of pipe nipples 214 conforms with the requirements of certain environmental control regulations. The stack portion 206 may include support members 216 attached to an upper end of stack portion 206 which may be used in conjunction with cables, wires, or similar devices to support the sampling probes inserted through pipe nipples 214 into the interior portion 212 of the stack portion 206.

Figure 8:
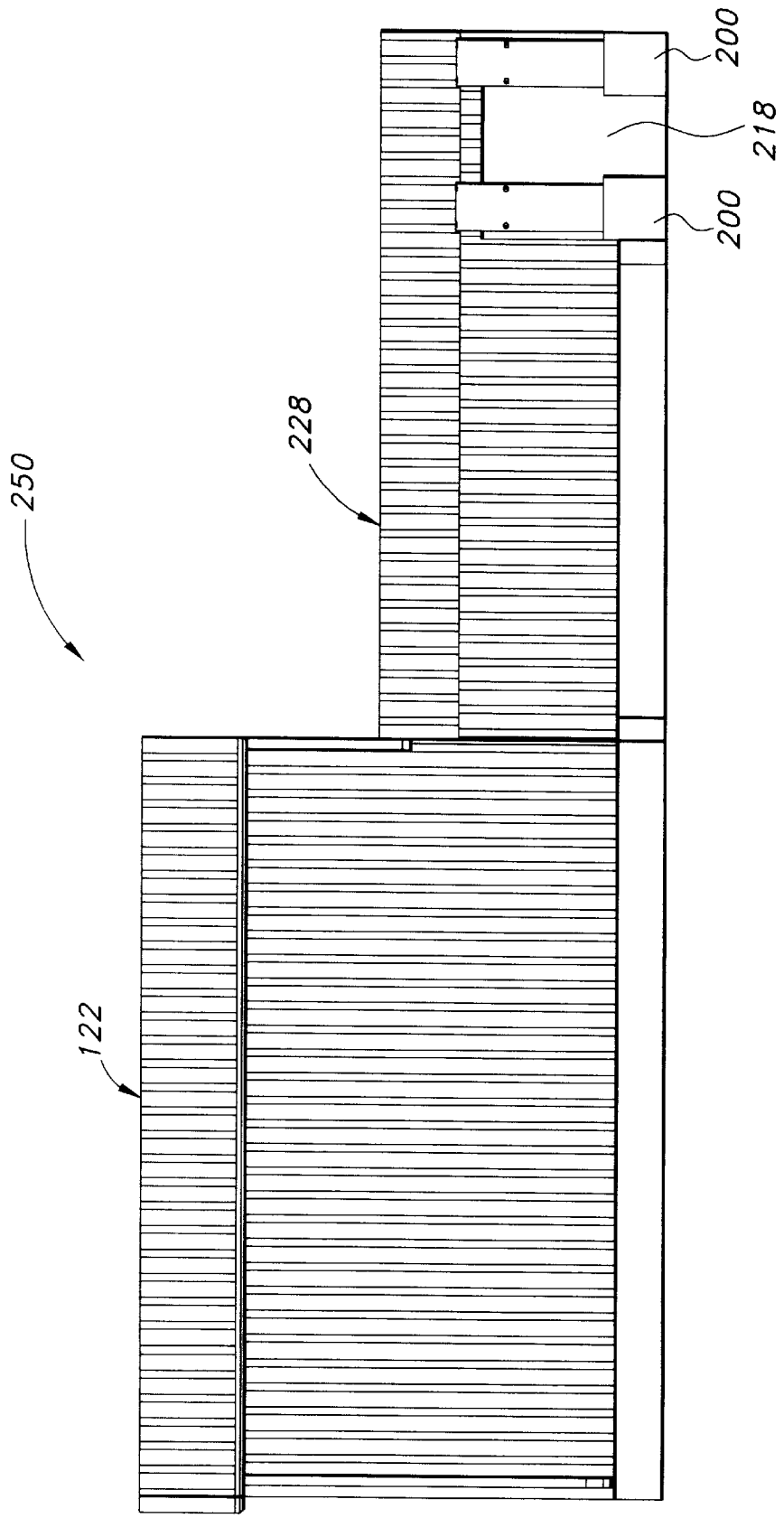
FIG. 8 is a side elevation view illustrating a pair of the exhaust stacks shown in FIG. 7 attached to the emission control system of the present invention.

FIG. 8 illustrates an emission control system 250 according to a second embodiment of the present invention which functions the same as the emission control system 120 and is constructed the same as emission control system 120 except as noted below. The emission control system 250 includes an upstream housing 122 which is constructed and functions as described previously with respect to the emission control system 120. However, the downstream housing 128 of the emission control system 120 is replaced by a downstream housing 228 in the emission control system 250. As shown in FIGS. 4 and 5 the rear wall 168 of the downstream housing 128 of emission control system 120 is positioned proximate the downstream, or aft end of the discharge port 142 formed in the floor 144 of the downstream housing 128. Also, the bag-type filter 132 occupies a substantial majority of the longitudinal extent of the downstream housing 128. The downstream housing 228 of emission control system 250 is the same as the downstream housing 128 of the emission control system 120 except that the length of downstream housing 228 is extended to accommodate the attachment of a pair of the exhaust test stacks 200 at a position aft of the discharge port 142 and the filter 132. More particularly, the length of side walls 164 and 166, as well as that of roof 172 are extended relative to the corresponding components of emission control system 120 to accommodate the attachment of a pair of the exhaust test stacks 200. The floor 144 may optionally be extended, with walls 164 and 166, or may terminate at the same location relative to the discharge port 142 as shown with respect to emission control system 120 so that the aft end of floor 144 is spaced apart and forward from the rear wall 168 of the downstream housing 228.

Figure 9:
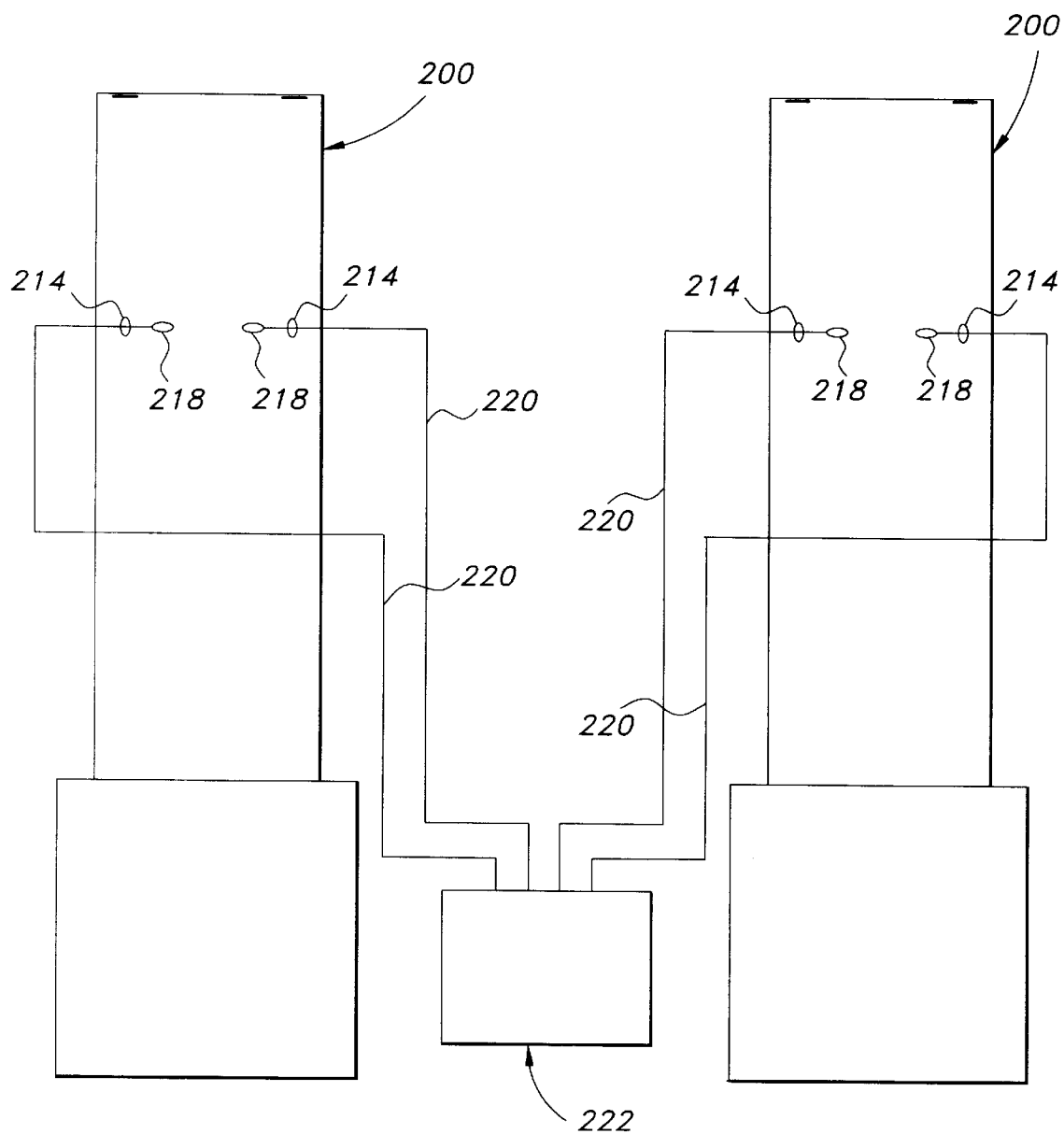
FIG. 9 is an elevation view illustrating the exhaust stacks shown in FIG. 8 and a schematic representation of the test equipment used to determine the airborne particulate matter flowing through the stacks.

FIGS. 8 and 9 illustrate the test setup which the inventor utilized to determine the airborne particulate matter discharging from the emission control system 250 which received a plurality of fiber-containing airflows form a cotton processing plant via a plurality of conduits communicating with the settling chamber 124. A pair of the exhaust test stacks 200 were attached to a sheet metal wall 218 which replaced a portion of the wall 164 of the downstream housing 228, with the stacks 200 being positioned at a location aft of the discharge port 142 formed in the floor 144 of the downstream housing 228. The sheet metal wall 218 extended to the ground level as shown in FIG. 8. A pair of the exhaust stacks 200 were utilized in order the accommodate the fiber-containing airflow discharging from the emission control system 250 without creating an excessive pressure within either the downstream 228 or upstream 122 housings. In the particular application, the airflow flowing through one of the test stacks 200, was measured to be 23,757 actual cubic feet per minute (acfm) and the airflow flowing through the other stack 200 was measured to be 26,762 acfm based on an average of three tests. It should be understood that in other applications, either a single stack 200 or three or more stacks 200 may be utilized, depending upon the magnitude of the airflow discharging from the emission control system 250. During the testing, the chambers 204 of each of the test stacks 200 were in flow communication with the filtering chamber 130 of the downstream housing 228, via the corresponding opening 208. The discharge port 142 formed in the floor 144 of the downstream housing 228 was closed, thereby forcing all of the airflow within housing 228 to discharge through one of the exhaust test stacks 200.

In the emission control system 250 which was tested, the settling chamber 124 of the upstream housing 122 had a volume of 32,256 ft$^3$ and the surface area of the bag-type filter 132 was 1,400 ft$^2$. Also, the magnitude of the fiber-containing airflow 140 was 50,519 actual cubic feet per minute (equal to the sum of the flow through the two stacks 200), and had a velocity of 0.731 ft/sec. Accordingly, the ratio of the magnitude of fiber-containing airflow 140 to the volume of settling chamber 124 was 1.57 and the ratio of the magnitude of the fiber-containing airflow 140 to the area of filter 132 was 36.09.

The test procedures were conducted in accordance with the Code of Federal Regulations, Title 40, Part 60, Appendix A, (40 C.F.R. 60, Appendix A) Revised as of Jul. 1, 1997. More specifically, Method 1 of 40 C.F.R. 60, Appendix A was used to determine the number of test sample points and the procedures of Method 5 of 40 C.F.R. 60, Appendix A were used to determine flow rates, moisture content and particulate emissions. Furthermore, the sampling train used was identical to that used in Method 5 except that the cyclone was omitted. Sample duration was 60 minutes and sampling was performed in triplicate. Both of the test stacks 200 were sampled simultaneously. Methods 1 and 5 of the previously discussed revision of 40 C.F.R. 60, Appendix A are expressly incorporated by reference herein.

A sampling probe 218 was inserted through each of the pipe nipples 214 with the probe tip disposed in the fiber-containing airflow flowing through the exhaust test stacks 200. Each of the test probes 218 were fluidly coupled, via a sampling line 220, to a sampling train of test equipment specified in 40 C.F.R. 60, Appendix A, Method 5. The collective test equipment for all of the probes 218 is indicated generally at 222. However, it should be understood that separate test sampling trains were used for each of the probes 218. For more specific information concerning the sampling trains used the reader is referred to 40 C.F.R. 60, Appendix A, Method 5.

The tests which were conducted demonstrated that the total particulate emissions, i.e. that flowing through both of the exhaust test stacks 200, was 0.42 pounds/hour. This represents a dramatic reduction in airborne pollution, in the form of airborne particulate matter, relative to that associated with the previously discussed cyclones 38 which are typically used in conjunction with various fiber processing plants such as cotton gin 10. The foregoing test results also demonstrated that the emission control system 250 complied with the governing environmental control regulations having a limit of 6.0 pounds/hour based on the production rate of the particular fiber processing plant discharging fiber-containing airflows into the emission control system 250 during the previously described testing.

While the foregoing description has set forth the preferred embodiments of the present invention in particular detail, it must be understood that numerous modifications, substitutions and changes can be undertaken without departing from the true spirit and scope of the present invention as defined by the ensuing claims. For instance, while the emission control system of the present invention has been illustrated for use in controlling the fiber-containing airflow discharging from a cotton gin, it must be understood that the emission control system of the present invention may be advantageously utilized to filter, and therefore control the airborne particulate matter discharging from a wide variety of fiber processing plants which process either natural or synthetic fibers. Furthermore, although the emission control system of the present invention has been illustrated as a separate entity relative to any fiber processing plant, the emission control system of the present invention may be attached directly to a fiber processing plant whereby one or more walls of the fiber processing plant also comprises one of the side walls of the upstream or downstream housings of the emission control system, or both. The invention is therefore not limited to specific preferred embodiments as described, but is only limited as defined by the following claims.

What is claimed is:

1. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communicating with the at least one conduit whereby said settling chamber receives the fiber-containing airflow discharging from the at least one conduit, said upstream housing including a floor;

a downstream housing defining a filtering chamber within said downstream housing, said filtering chamber communicating with said settling chamber; and a porous, bag-type filter disposed within said filtering chamber and having an inlet opening in communication with said settling chamber, whereby the fiber-containing airflow entering said settling chamber flows through said inlet opening and into an interior portion of said bag-type filter, said porous, bag-type filter including a forward end which defines said inlet opening of said filter, said forward end having a lower portion disposed in substantially sealing engagement with said floor of said upstream housing;

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port.

2. The emission control system as recited in claim 1, wherein:

said porous, bag-type filter is made of a fabric material having a mesh size ranging from about 60 mesh to about 100 mesh.

3. The emissions control system as recited in claim 1, further comprising:

means for supporting said porous, bag-type filter within said filtering chamber of said downstream housing.

4. The emission control system as recited in claim 1, wherein:

said upstream housing further includes a rear wall extending upwardly from said floor;

said forward end of said porous bag-type filter is attached to said rear wall.

5. The emission control system as recited in claim 4, wherein:

said upstream housing further includes a forward wall extending upwardly from said floor and spaced apart from said rear wall;

said inlet opening of said porous, bag-type filter faces said forward wall of said upstream housing.

6. The emission control system as recited in claim 1, wherein:

said downstream housing includes a floor;

said floor of said downstream housing is substantially co-planar with said floor of said upstream housing.

7. An emission control system as recited in claim 1, wherein:

said upstream housing includes a foundation having an upper surface, said upper surface of said foundation comprising said floor of said upstream housing.

8. An emission control system as recited in claim 7, wherein:

said foundation of said upstream housing is made of concrete.

9. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communicating with the at least one conduit whereby said settling chamber receives the fiber-containing airflow discharging from the at least one conduit;

a downstream housing defining a filtering chamber within said downstream housing, said filtering chamber communicating with said settling chamber; and a porous, bag-type filter disposed within said filtering chamber and having an inlet opening in communication with said settling chamber, whereby the fiber-containing airflow entering said settling chamber flows through said inlet opening and into an interior portion of said bag-type filter:

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port; wherein:

said porous, bag-type filter is made of a fabric material having a mesh size ranging from about 60 mesh to about 100 mesh;

said porous, bag-type filter has a surface area and a ratio of the fiber-containing airflow, in actual $ft^3$/min, to said surface area, in $ft^2$, is no greater than 65;

said surface area and said mesh size of said filter combine to control the amount of particulate matter within the fiber-containing airflow discharging through said outlet port to a weight flowrate of less than 6.0 lbs/hr.

10. The emission control system as recited in claim 9, wherein:

said mesh size and surface area of said porous, bag-type filter combine to control the amount of particulate matter within the fiber-containing airflow discharging through said outlet port to a weight flowrate of less than 1.0 lbs/hr.

11. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communication with the at least one conduit whereby said settling chamber receives the fiber-containing airflow discharging from the at least one conduit;

a downstream housing defining a filtering chamber within said downstream housing, said filtering chamber communicating with said settling chamber; and a porous, bag-type filter disposed within said filtering chamber and having an inlet opening in communication with said settling chamber, whereby the fiber-containing airflow entering said settling chamber flows through said inlet opening and into an interior portion of said bag-type filter;

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port; wherein:

said settling chamber has a volume and the fiber-containing airflow as a volumetric flowrate;

a ratio of the volumetric flowrate of the fiber-containing airflow, in actual ft$^3$/min to said volume of said settling chamber, in ft$^3$, is no greater than 3.0.

12. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communicating with the at least one conduit whereby said settling chamber receives the fiber-containing airflow discharging from the at least one conduit;

a downstream housing defining a filtering chamber within said downstream housing, said filtering chamber communicating with said settling chamber; and a porous, bag-type filter disposed within said filtering chamber and having an inlet opening in communication with said settling chamber, whereby the fiber-containing airflow entering said settling chamber flows through said inlet opening and into an interior portion of said bag-type filter;

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port; wherein:

said downstream housing includes a floor;

said discharge port is formed in sa id floor.

13. The emission control system as recited in claim 12, wherein said downstream housing further includes:

a pair of opposing side walls extending upwardly from said floor;

a forward wall extending upwardly from said floor and attached to each of said side walls, said forward wall having an opening formed therein providing communication between said filtering chamber and said settling chamber;

a rear wall extending upwardly from said floor and attached to each of said side walls; and a roof attached to said forward wall, said rear wall and each of said side walls.

14. The emission control system as recited in 13, wherein:

said bag-type filter includes a forward end which defines said opening of said filter;

said forward end extends through said opening in said forward wall of said downstream housing and is disposed in sealing engagement with said forward wall of said downstream housing.

15. The emission control system as recited in claim 14, wherein:

said upstream housing includes a floor and a rear wall extending upwardly from said floor, said rear wall having a lower portion;

said lower portion of said rear wall of said upstream housing comprises said forward wall of said downstream housing.

16. The emission control system as recited in 14, wherein:

said forward end of said bag-type filter includes a web which is attached to a forward surface of said forward wall of said downstream housing.

17. The emission control system as recited in claim 16, wherein:

said web is fastened to said forward surface of said forward wall of said downstream housing.

18. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communicating with the at least one conduit whereby said settling chamber receives the fiber-containing airflow discharging from the at least one conduit;

a downstream housing defining a filtering chamber within said downstream housing, said filtering chamber communicating with said settling chamber; and a porous, bag-type filter disposed within said filtering chamber and having an inlet opening in communication with said settling chamber, whereby the fiber-containing airflow entering said settling chamber flows through said inlet opening and into an interior portion of said bag-type filter;

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port;

wherein said upstream housing includes:

a floor;

a pair of opposing side walls extending upwardly from said floor;

a forward wall extending upwardly from said floor and attached to each of said side walls;

a rear wall extending upwardly and attached to each of said side walls, said rear wall including an opening formed therein providing communication between said settling chamber and said filtering chamber;

a roof attached to said forward wall, said rear wall and each of said side walls.

19. The emission control system as recited in claim 18, wherein:

said upstream housing includes at least one aperture, each said aperture receiving one of the at least one conduit of the fiber processing plant;

said at least one aperture being formed in one of said forward wall and said side walls.

20. The emission control system as recited in claim 18, wherein:

said upstream housing includes an access door formed in one of said forward wall and said side walls.

21. A method for controlling the airborne particulate matter discharging from a fiber processing plant having at least one fiber processing device and at least one conduit transporting a fiber-containing airflow from the device, said method comprising the steps of:

providing an upstream housing defining a settling chamber within the upstream housing, the upstream housing including a floor;

providing a downstream housing defining a filtering chamber within the downstream housing;

supplying the fiber-containing airflow to the settling chamber;

diffusing the fiber-containing airflow within the settling chamber causing at least a portion of the fibers within the fiber-containing airflow to precipitate out of the airflow and settle onto the floor of the upstream housing;

establishing flow communication between the settling chamber and the filtering chamber;

filtering the fiber-containing airflow as it flows through the filtering chamber, said step of filtering comprising the steps of:

disposing a porous, bag-type filter within the filtering chamber;

providing the filter with an inlet opening communicating with the settling chamber;

defining the inlet opening with a forward end of the porous, bag-type filter;

disposing a lower portion of the forward end of the porous, bag-type filter in substantially sealing engagement with the floor of the upstream housing;

capturing at least a portion of the particulate matter in the fiber-containing airflow within an interior of the porous, bag-type filter;

said method further comprising the step of discharging the fiber-containing airflow from the filtering chamber.

22. The method as recited in claim 21, wherein;

the downstream housing includes a floor and said method further comprises the step of:

disposing the floor of the upstream housing and the floor of the downstream housing in substantially co-planar relationship with one another.

23. The method as recited in claim 22, wherein said step of filtering further comprises the step of:

using a fabric material having a mesh size ranging from about 60 mesh to about 100 mesh to manufacture the porous, bag-type filter.

24. The method as recited in claim 21, wherein said step of establishing comprises the step of:

forming an opening in a wall separating the settling and filtering chambers.

25. The method as recited in claim 24, further comprising the step of:

forcing substantially all of the fiber-containing airflow to flow through the filter.

26. The method as recited in claim 25, wherein said step of forcing comprises the steps of:

disposing said forward end of the filter within the opening in the wall separating the settling and filtering chambers;

attaching the forward end of the filter to the wall separating the settling and filtering chambers.

27. A method for controlling the airborne particulate matter discharging from a fiber processing plant having at least one fiber processing device and at least one conduit transporting a fiber-containing airflow from the device, said method comprising the steps of:

providing an upstream housing defining a settling chamber within the upstream housing;

providing a downstream housing defining a filtering chamber within the downstream housing;

supplying the fiber-containing airflow to the settling chamber;

diffusing the fiber-containing airflow within the settling chamber causing at least a portion of the fibers within the fiber-containing airflow to precipitate out of the airflow and settle onto a floor of the upstream housing;

establishing flow communication between the settling chamber and the filtering chamber;

filtering the fiber-containing airflow as it flows through the filtering chamber;

discharging the fiber-containing airflow from the filtering chamber;

wherein said step of filtering comprises the step of:

controlling the weight flowrate of particulate matter in the fiber-containing airflow to a magnitude of less than 6.0 lbs/hr as the airflow discharges from the filtering chamber.

28. A method for controlling the airborne particulate matter discharging from a fiber processing plant having at least one fiber processing device and at least one conduit transporting a fiber-containing airflow from the device, said method comprising the steps of:

providing an upstream housing defining a settling chamber within the upstream housing;

providing a downstream housing defining a filtering chamber within the downstream housing;

supplying the fiber-containing airflow to the settling chamber;

diffusing the fiber-containing airflow within the settling chamber causing at least a portion of the fibers within the fiber-containing airflow to precipitate out of the airflow and settle onto a floor of the upstream housing;

establishing flow communication between the settling chamber and the filtering chamber;

filtering the fiber-containing airflow as it flows through the filtering chamber;

discharging the fiber-containing airflow from the filtering chamber;

wherein said step of filtering comprises the step of:

controlling the weight flowrate of particulate matter in the fiber-containing airflow to a magnitude of less than 1.0 lbs/hr as the airflow discharges from the filtering chamber.

29. A method for controlling the airborne particulate matter discharging from a fiber processing plant having at least one fiber processing device and at least one conduit transporting a fiber-containing airflow from the device, said method comprising the steps of:

providing an upstream housing defining a settling chamber within the upstream housing;

providing a downstream housing defining a filtering chamber within the downstream housing;

supplying the fiber-containing airflow to the settling chamber;

diffusing the fiber-containing airflow within the settling chamber causing at least a portion of the fibers within the fiber-containing airflow to precipitate out of the airflow and settle onto a floor of the upstream housing;

establishing flow communication between the settling chamber and the filtering chamber;

filtering the fiber-containing airflow as it flows through the filtering chamber;

discharging the fiber-containing airflow from the filtering chamber;

wherein said step of diffusing comprises the step of:

sizing the settling chamber so that a ratio of the volumetric flowrate of the fiber-containing airflow, in actual ft$^3$/min, to said volume of said settling chamber, in ft$^3$, is no greater than 3.0.

30. A method for controlling the airborne particulate matter discharging from a fiber processing plant having at least one fiber processing device and at least one conduit transporting a fiber-containing airflow from the device said method comprising the steps of:

providing an upstream housing defining a settling chamber within the upstream housing;

providing a downstream housing defining a filtering chamber within the downstream housing;

supplying the fiber-containing airflow to the settling chamber;

diffusing the fiber-containing airflow within the settling chamber causing at least a portion of the fibers within the fiber-containing airflow to precipitate out of the airflow and settle onto a floor of the upstream housing;

establishing flow communication between the settling chamber and the filtering chamber;

filtering the fiber-containing airflow as it flows through the filtering chamber;

discharging the fiber-containing airflow from the filtering chamber; and forming a discharge port in a floor of the downstream housing; wherein said step of discharging comprises the step of discharging the fiber-containing airflow through the discharge port in the floor of the downstream housing.

31. An emission control system for controlling the amount of airborne particulate matter discharging from a fiber processing plant having at least one fiber processing device and at least one conduit communicating with the fiber processing device, the conduit being effective for transporting a fiber-containing airflow discharging from the device during operation of the device, said emission control system comprising:

an upstream housing defining a settling chamber within said upstream housing, said settling chamber communicating with the at least one conduit whereby said settling chamber receives the fiber-containing airflow discharging from the at least one conduit, said upstream housing including a floor;

a downstream housing defining a filtering chamber within said downstream housing, said filtering chamber communicating with said settling chamber, said downstream housing including a floor, said floor of said downstream housing being substantially co-planar with said floor of said upstream housing; and a porous, bag-type filter disposed within said filtering chamber and having an inlet opening in communication with said settling chamber, whereby the fiber-containing airflow entering said settling chamber flows through said inlet opening and into an interior portion of said bag-type filter;

said downstream housing including a discharge port located downstream of said porous, bag-type filter, said discharge port communicating with said filtering chamber whereby the fiber-containing airflow entering said interior portion of said filter flows through said filter, thereby entraining a substantial portion of the particulate matter in the fiber-containing airflow, and discharges from said filtering chamber through said outlet port.

* * * * *